Jan. 25, 1927.

J. I. MISENER 1,615,818

WOODWORKING TOOL

Filed March 10, 1925

INVENTOR.
BY John I. Misener

ATTORNEY.

Patented Jan. 25, 1927.

1,615,818

UNITED STATES PATENT OFFICE.

JOHN I. MISENER, OF SYRACUSE, NEW YORK, ASSIGNOR TO MISENER & IRVING MANUFACTURING CO. INC., OF SYRACUSE, NEW YORK, A CORPORATION OF NEW YORK.

WOODWORKING TOOL.

Application filed March 10, 1925. Serial No. 14,551.

My invention relates to wood working tools and particularly to tools for removing floor boards and the like, which are mortised together with the usual tongue and groove, and has for its object a wood working tool which is particularly simple in construction, and highly efficient and durable in use.

In describing this invention reference is had to the accompanying drawings in which like characters designate corresponding parts in all the views.

Figure 1 is a side elevation of my wood working tool with a floor board illustrated in dotted lines.

Figure 2 is an enlarged sectional view taken on line 2—2, Fig. 1.

My invention comprises generally a wood chisel with the usual shank and cutting edge, and a detachable hatchet-like blade and hammer-like head fixed thereto near said cutting edge.

In the drawing 1 is the wood chisel with the usual shank 2 flattened portion 3 and cutting edge 4.

5 is the blade, and 6 is the head, here shown as detachably fixed to the flattened portion 3 of the chisel and extending across said chisel and at an angle to the cutting edge 4.

The flattened portion 3 of the chisel is formed with a passage 7 therethrough, and the blade 5 with a similar passage 8. A portion of the head 6 is cut away as at 9 along its length leaving an overhanging portion 10, and providing a shoulder 11 to be hereinafter described.

12 is a bolt, here shown as having one end thereof fixed in the lower portion of the head 6, and having its other end extending through said cut away portion 9 midway between the shoulder 11 and the lower end of said pounding head.

In assembling the blade 5 is placed against the head 6 with one flat side thereof against the cut away portion 9 of said head and with the upper edge 13 thereof resting against the shoulder 11 formed by the overhanging portion 10 of the head and with the bolt 12 extending through the passage 8 therein. The bolt 12 is then passed through the passage 7 in the flattened portion 3 of the chisel with the upper part of said chisel resting against the shoulder 11 of the head. All of said parts are then clamped together by means of the nut 14 threading upon the outer end of the bolt.

Means is provided for gauging the depth to what the blade 5 is to cut, and also to pry the blade from the wood and as here shown comprises a stop fixed to the back portion of the blade 5 near the cutting edge.

Preferably the stop comprises rollers 15 fixed to the lower back corner of said blade as by the rivet 16 with the lower portion thereof on a line with the cutting edge of the blade.

In use the blade 5 is driven into the crack between the floor boards until the front point thereof has passed through the tongue 17 of said board and the stop or rollers 15 are in contact therewith, as illustrated in Fig. 1. The angle at which the shank 2 of the chisel is held determines the proper depth for the thickness of floor board being removed. Continued pounding on the head 6 moves the tool backwards cutting the tongue off the entire length of the board, and upon a downward movement of the shank 2, the tool fulcrums upon the rollers 15 and pries or lifts the blade 5 out of the floor.

What I claim is:—

1. A wood working tool, comprising a chisel having the usual shank and a cutting edge at one end thereof, a pounding head and a blade detachably fixed thereto intermediate its ends, with the cutting edge of the blade extending at an angle to the cutting edge of said chisel and parallel to the shank of the chisel.

2. A wood working tool, comprising a chisel having the usual cutting edge, a pounding head and a blade fixed thereto, said blade having its cutting edge extending at an angle to the cutting edge of said chisel and a member fixed to the rear portion of said blade near said cutting edge for gauging the depth to which said blade shall cut.

3. A wood working tool, comprising a chisel having the usual cutting edge at one end thereof, parts removably fixed thereto, near said cutting edge and at an angle thereto, comprising a pounding head and a hatchet-like blade, and rollers mounted upon opposite sides of the back portion of said blade near the cutting edge thereof, for gauging the depth to which said blade shall cut, and providing a fulcrum for removing said blade.

4. The combination with a chisel having the usual shank, handle portion, and a flattened portion with a cutting edge at the end thereof, of a flat hatchet shaped blade arranged on said flattened portion with the top part thereof flush with the upper edge of said flattened portion, a hammer head arranged on the blade with the upper portion extending over the top of said blade and chisel, a bolt extending through said head, blade and chisel, a nut on the end of said bolt, and means on said blade for gauging the depth to which the blade shall cut.

In testimony whereof, I have hereunto signed my name, at Syracuse, in the county of Onondaga, and State of New York, this 21st day of February, 1925.

JOHN I. MISENER.